UNITED STATES PATENT OFFICE.

ERNST WILHELM RUDOLF SCHRÖTER, OF HAMBURG, GERMANY.

TOPICAL REMEDY.

SPECIFICATION forming part of Letters Patent No. 318,662, dated May 26, 1885.

Application filed August 5, 1884. (No specimens.)

*To all whom it may concern:*

Be it known that I, ERNST WILHELM RUDOLF SCHRÖTER, a subject of the Emperor of Germany, and a resident of Hamburg, in the German Empire, have invented a new Medical Compound, of which the following is a specification.

Oils which contain sulphur in natural chemical combination—such as schist-oil, &c.—are mixed with an equal or up to the threefold quantity of concentrated sulphuric acid. Thereby the mixture is heated and a violent reaction is produced, during which large quantities of sulphurous acid escape. One part of the oil enters in chemical combination with the sulphuric acid, thus becoming absolutely soluble in water, while the residual is collected on the level of the water, and remains as oil, insoluble in water. After separating the oil from the sulphuret the latter is washed out, thus becoming cleaned of the sulphuric and sulphurous acid, which are mixed therewith only mechanically. Thus a new compound, the ichthyolsulphur acid, remains as a darkly-green, molasses-like, acidly reacting matter. By neutralizing such ichthyolsulphur acid, which always contains still a surplus of sulphuric and sulphurous acid, with natron, potash, ammonia, or any other base, ichthyolsulphuret of natron or potash or ammonia, &c., is produced, of which the two first ones are to be washed out with water, in order to remove the sulphate and sulphite of soda or potash.

When the ichthyolsulphur acid is treated repeatedly with concentrated sulphuric acid, bisulphates, trisulphates, &c., are produced, which also are absolutely soluble in water, contain corresponding larger quantities of sulphur and oxygen, and also may be transformed into bibasical salts by neutralizing with a base.

The resulting compounds of the above process, consisting of icthyolsulphur acid, or of alkaline icthyolsulphurets, which may be applied in a pure state, in alcoholic or etheric solution, or combined with a saponifiable or non-saponifiable fat, as a salve, in case of rheumatism, neuralgia, and in diseases of the skin generally.

Having thus fully described the nature of my invention, what I desire to claim and secure by Letters Patent is—

1. The hereinbefore-described icthyolsulphur acid, consisting of an oil containing sulphur and sulphuric acid chemically combined, in the proportions and for the purpose set forth.

2. As a manufactured product, icthyolsulphur acid, consisting of schist-oil and concentrated sulphuric acid in chemical combination in the proportions hereinbefore described, and for the purpose set forth.

In testimony that I claim the foregoing as my invention I have signed my name, in presence of two witnesses, this 15th day of July, 1884.

ERNST WILHELM RUDOLF SCHRÖTER.

Witnesses:
ALEXANDER SPECHT,
DIEDRICH PETERSEN.